(12) United States Patent
Kozaki (10) Patent No.: US 10,968,949 B2
(45) Date of Patent: Apr. 6, 2021

(54) MAGNETIC BEARING CONTROL DEVICE AND VACUUM PUMP

(71) Applicant: SHIMADZU CORPORATION, Kyoto (JP)

(72) Inventor: Junichiro Kozaki, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 338 days.

(21) Appl. No.: 16/055,056

(22) Filed: Aug. 4, 2018

(65) Prior Publication Data
US 2019/0072131 A1 Mar. 7, 2019

(30) Foreign Application Priority Data

Sep. 4, 2017 (JP) .............................. JP2017-169715

(51) Int. Cl.
*F16C 32/04* (2006.01)
*H02K 5/24* (2006.01)
(Continued)

(52) U.S. Cl.
CPC ...... *F16C 32/0453* (2013.01); *F16C 32/0442* (2013.01); *F16C 32/0446* (2013.01);
(Continued)

(58) Field of Classification Search
CPC .... H02K 7/09; H02K 5/24; H02P 8/32; H02P 1/00; F04D 19/048; F04D 29/668;
(Continued)

(56) References Cited

U.S. PATENT DOCUMENTS

| 4,121,143 A | 10/1978 | Habermann |
| 5,256,952 A * | 10/1993 | Yoneyama ............... F16F 15/18 |
| | | 310/90.5 |

(Continued)

FOREIGN PATENT DOCUMENTS

| JP | 52-093852 | 8/1977 |
| JP | 2017-075666 | 4/2017 |

OTHER PUBLICATIONS

Office Action for corresponding Chinese Application No. 201811013001.4 dated Dec. 4, 2019 with machine translation.

(Continued)

*Primary Examiner* — Bick Dhakal
(74) *Attorney, Agent, or Firm* — Renner, Otto, Boisselle & Sklar, LLP (57) ABSTRACT

A first arithmetic section calculates a current rotation component phase value and a current rotation component amplitude value. A second arithmetic section calculates a displacement rotation component phase value and a displacement rotation component amplitude value. A third arithmetic section calculates a ratio between the amplitude value of the current rotation frequency component and the amplitude value of the displacement rotation frequency component. Feedback control is performed such that the current rotation component phase value is equal to a value obtained by addition of a phase value of 180 degrees to the displacement rotation component phase value and that the amplitude value of the current rotation frequency component is equal to a product of the displacement rotation frequency component and the ratio.

6 Claims, 8 Drawing Sheets

(51) Int. Cl.
*H02P 1/00* (2006.01)
*H02K 7/09* (2006.01)

(52) U.S. Cl.
CPC ............ *H02K 5/24* (2013.01); *F16C 2360/45* (2013.01); *H02K 7/09* (2013.01); *H02P 1/00* (2013.01)

(58) Field of Classification Search
CPC ............... F16C 32/0406; F16C 32/044; F16C 32/0489; F16C 19/527; F16C 32/0453; F16C 32/0442; F16C 32/0446; F16C 2360/45; F16C 32/0444
See application file for complete search history.

(56) References Cited

U.S. PATENT DOCUMENTS

| | | | | |
|---|---|---|---|---|
| 6,111,333 | A * | 8/2000 | Takahashi | H02K 7/09 310/90.5 |
| 6,346,757 | B1 * | 2/2002 | Shinozaki | F16C 32/0457 310/90.5 |
| 6,515,387 | B1 * | 2/2003 | Shinozaki | F16C 32/0451 310/90.5 |
| 2014/0271237 | A1 * | 9/2014 | Kozaki | F04D 27/001 417/45 |
| 2017/0110930 | A1 | 4/2017 | Kozaki | |

OTHER PUBLICATIONS

Office Action for corresponding Japanese Application No. 2017-169715 dated Oct. 27, 2020 with English language translation.

\* cited by examiner

MAGNETIC BEARING CONTROL DEVICE AND VACUUM PUMP

BACKGROUND OF THE INVENTION

1. Technical Field

The present invention relates to a magnetic bearing control device and a vacuum pump.

2. Background Art

In the case of a rotor to be magnetically levitated and supported by an active magnetic bearing, if there is rotor unbalance, vibration by a rotation frequency component due to such unbalance occurs, and is transmitted to a stator side due to reaction of electromagnet force. Patent Literature 1 (JP-A-2017-075666) describes a magnetic bearing device configured so that undesirable vibration transmitted to a stator side can be reduced.

In the magnetic bearing device described in Patent Literature 1, a signal obtained in such a manner that a rotation frequency component is cancelled from a displacement signal applied to levitation control is input to a magnetic levitation controller, and in this manner, an excitation current control signal is generated. Thus, current of a rotation frequency component contained in electromagnet excitation current is removed. Further, for an output signal of the magnetic levitation controller, addition/subtraction of a signal for reducing electromagnet force fluctuation due to a rotor displacement rotation component is performed. In this manner, further vibration reduction is realized.

In the technique described above with reference to Patent Literature 1, gain and phase correction needs to be performed for the signal for reducing the electromagnet force fluctuation due to the rotor displacement rotation component. However, it is difficult to make a remaining signal of the rotation frequency component in the output signal of the magnetic levitation controller completely zero. In fact, it is often the case that such a signal remains, and therefore, fine adjustment of a gain change and a phase delay needs to be performed for each device before shipment.

SUMMARY OF THE INVENTION

According to the present invention, vibration reduction can be realized without gain or phase adjustment.

A magnetic bearing control device comprises: for at least a single-axis magnetic bearing of an active magnetic bearing device configured to magnetically levitate and support a rotor shaft, a first arithmetic section configured to calculate, with respect to a reference rotation signal, a current rotation component phase value and a current rotation component amplitude value of a current rotation frequency component contained in excitation current of the magnetic bearing, a second arithmetic section configured to calculate, with respect to the reference rotation signal, a displacement rotation component phase value and a displacement rotation component amplitude value of a displacement rotation frequency component contained in a displacement signal of the rotor shaft, and a third arithmetic section configured to calculate a ratio between the amplitude value of the current rotation frequency component and the amplitude value of the displacement rotation frequency component in the case of cancelling force generated by the displacement rotation frequency component by force generated by the current rotation frequency component. Feedback control is performed such that the current rotation component phase value is equal to a value obtained by addition of a phase value of 180 degrees to the displacement rotation component phase value and that the amplitude value of the current rotation frequency component is equal to a product of the displacement rotation frequency component and the ratio.

The magnetic bearing control device, further comprises: a first controller taking, as input, a deviation between the value obtained by the addition and the current rotation component phase value and having an integral equivalent amount; a second controller taking, as input, a deviation between the product of the displacement rotation frequency component and the ratio and the amplitude value of the current rotation frequency component and having an integral equivalent amount; and a fourth arithmetic section configured to generate a current rotation component sinusoidal signal based on an output value of the first controller and an output value of the second controller. The feedback control is performed using the current rotation component sinusoidal signal.

The at least single-axis magnetic bearing is a two-axis radial magnetic bearing configured to support the rotor shaft in a radial direction, and the second arithmetic section calculates, with respect to the reference rotation signal, a displacement rotation component phase value and a displacement rotation component amplitude value of a displacement rotation frequency component contained in a displacement signal for each axis direction of the two axes.

The magnetic bearing control device, further comprises: a first controller taking, as input, a deviation between the value obtained by the addition and the current rotation component phase value and having an integral equivalent amount; a second controller taking, as input, a deviation between the product of the displacement rotation frequency component and the ratio and the amplitude value of the current rotation frequency component and having an integral equivalent amount; and a fourth arithmetic section configured to generate, based on an output value of the first controller and an output value of the second controller, a current rotation component sinusoidal signal as a feedback control signal for one of the two axes of the two-axis radial magnetic bearing and generate a current rotation component cosine signal as a feedback control signal for the other axis of the two-axis radial magnetic bearing.

The third arithmetic section includes an extraction section configured to extract a DC component of the excitation current, and calculates the ratio based on the extracted DC component.

The magnetic bearing control device, further comprises: a conversion section configured to generate a displacement signal corresponding to displacement at a magnetic bearing position based on a sensor signal from a displacement sensor configured to detect displacement of a levitation position of the rotor shaft. The second arithmetic section calculates the displacement rotation component phase value and the displacement rotation component amplitude value based on the displacement signal generated by the conversion section.

A vacuum pump comprises: a pump rotor to be rotatably driven by a motor; a magnetic bearing device configured to magnetically levitate and support a rotor shaft of the pump rotor; and the magnetic bearing control device, the magnetic bearing control device being configured to control the magnetic bearing device.

DETAILED DESCRIPTION OF THE EXEMPLARY EMBODIMENTS

Figure 1:
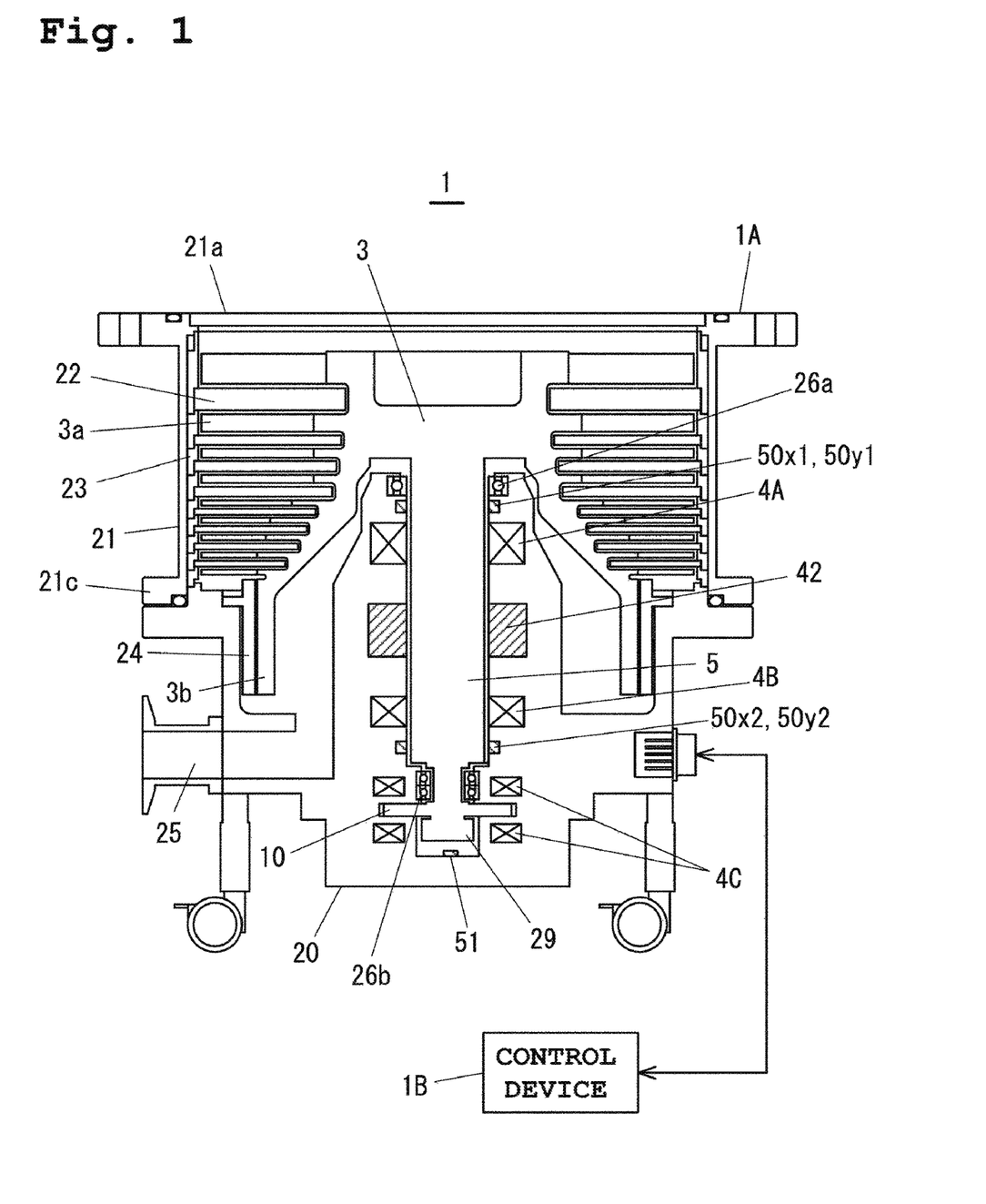
FIG. 1 is a view of an outline configuration of a pump main body of a turbo-molecular pump including a magnetic bearing device.

Hereinafter, embodiments of the present invention will be described with reference to the drawings. FIG. 1 is a view of an outline configuration of a turbo-molecular pump including a magnetic bearing device. As illustrated in FIG. 1, the turbo-molecular pump 1 includes a pump main body 1A and a control device 1B configured to control driving of the pump main body 1A.

A rotor shaft 5 provided at a pump rotor 3 of the pump main body 1A is non-contact supported by radial magnetic bearings 4A, 4B and an axial magnetic bearing 4C. Each of the radial magnetic bearings 4A, 4B includes four magnetic bearing electromagnets arranged in a radial direction of the rotor shaft 5. Magnetic bearing electromagnets of the axial magnetic bearing 4C are arranged to sandwich, in an axial direction, a thrust disc 10 fixed to a lower portion of the rotor shaft 5.

Displacement of the rotor shaft 5 is detected by radial direction displacement sensors $50x1$, $50y1$, $50x2$, $50y2$ and an axial direction displacement sensor 51. An inductance displacement sensor configured such that a coil is wound around a sensor core is used as each of the displacement sensors $50x1$, $50y1$, $50x2$, $50y2$, 51.

The pump rotor 3 magnetically levitated and rotatably supported by the magnetic bearings is rotatably driven at high speed by a motor 42. For example, a brushless DC motor is used as the motor 42. Note that although schematically illustrated as the motor 42 in FIG. 1, a portion indicated by a reference numeral "42" more specifically forms a motor stator, and a motor rotor is provided on a rotor shaft 5 side of the pump rotor 3.

A sensor target 29 is provided at a lower end of the rotor shaft 5 to be rotatably driven by the motor 42. The above-described axial direction displacement sensor 51 is arranged at a position facing a lower surface of the sensor target 29. When no magnetic bearings are in operation, the rotor shaft 5 is supported by emergency mechanical bearings 26a, 26b.

Multiple stages of rotor blades 3a and a cylindrical portion 3b forming a rotary side exhaust functional section are formed at the pump rotor 3. On the other hand, stationary blades 22 and a screw stator 24 forming a stationary side exhaust functional section are provided on a stationary side. The multiple stages of the stationary blades 22 and the rotor blades 3a are alternately arranged in the axial direction. The screw stator 24 is provided on an outer peripheral side of the cylindrical portion 3b with a predetermined gap.

Each stationary blade 22 is placed on a base 20 through a spacer ring 23. When a fixed flange 21c of a pump case 21 is fixed to the base 20 with bolts, the stack of the spacer rings 23 is sandwiched between the base 20 and the pump case 21, and in this manner, the position of each stationary blade 22 is determined. An exhaust port 25 is provided at the base 20, and a back pump is connected to the exhaust port 25. The pump rotor 3 is magnetically levitated while being rotatably driven at high speed by the motor 42. In this manner, gas molecules are exhausted from a suction port 21a side to an exhaust port 25 side.

Figure 2:
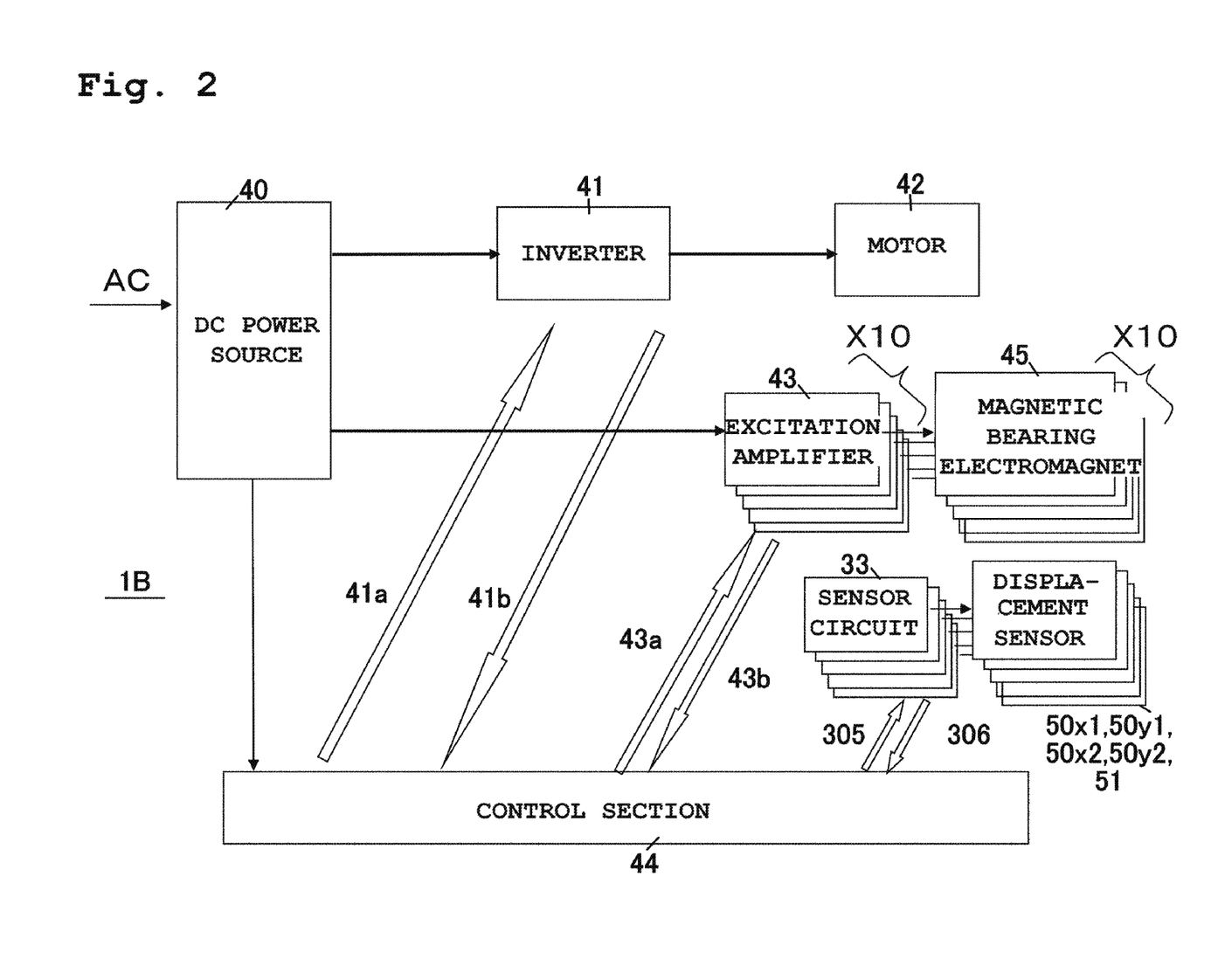
FIG. 2 is a block diagram of an outline configuration of a control device.

FIG. 2 is a block diagram of an outline configuration of the control device 1B. AC input from the outside is converted from AC to DC by a DC power source 40 provided at the control device 1B. The DC power source 40 generates power for an inverter 41, power for excitation amplifiers 43, and power for a control section 44.

The inverter 41 configured to supply the power to the motor 42 includes multiple switching elements. ON/OFF of these switching elements is controlled by the control section 44, and in this manner, the motor 42 is driven.

As described above, the magnetic bearings configured to magnetically levitate and support the rotor shaft 5 form a five-axis active magnetic bearing (AMB) having four axes in the radial direction and a single axis in the axial direction. A pair of electromagnets is provided for each axis, and therefore, ten magnetic bearing electromagnets 45 are provided as illustrated in FIG. 2. The excitation amplifier 43 configured to supply excitation current to the magnetic bearing electromagnet 45 is provided for each of ten magnetic bearing electromagnets 45.

The control section 44 configured to control driving of the motor 42 and driving of the magnetic bearings includes, for example, a digital arithmetic processor such as a field programmable gate array (FPGA) and peripheral circuits thereof. For motor control, a PWM control signal 41a for controlling ON/OFF of the multiple switching elements provided at the inverter 41 is input from the control section 44 to the inverter 41. Moreover, a signal 41b regarding phase voltage and phase current for the motor 42 is input from the inverter 41 to the control section 44.

For magnetic bearing control, a PWM gate drive signal 43a for controlling ON/OFF of a switching element provided at each excitation amplifier 43 is input from the control section 44 to each excitation amplifier 43. Moreover, a current detection signal 43b regarding a current value of each magnetic bearing electromagnet 45 is input from each excitation amplifier 43 to the control section 44.

A sensor circuit 33 is provided for each of the displacement sensors $50x1$, $50y1$, $50x2$, $50y2$, 51. A sensor carrier signal (a carrier wave signal) 305 is input from the control section 44 to each sensor circuit 33. A sensor signal 306 modulated due to displacement of the rotor shaft 5 is input from each sensor circuit 33 to the control section 44.

When a levitation position of the rotor shaft 5 changes due to vibration from the outside or rotor whirling, even if the excitation current is constant, force acting on the rotor shaft 5 from the magnetic bearing changes. For example, when the rotor shaft 5 approaches the magnetic bearing electromagnet 45, attraction force becomes greater. Conversely, when the rotor shaft 5 moves apart from the magnetic bearing electromagnet 45, the attraction force becomes smaller. For this reason, when whirling of the rotor shaft 5 occurs due to rotor unbalance, pump vibration occurs due to reaction of the force acting on the rotor shaft 5. As will be described below, fluctuation in the force due to rotor displacement (vibration displacement) caused by the above-described rotor unbalance is, in the present embodiment, cancelled by the force due to fluctuation in the excitation current. In this manner, vibration due to unbalance etc. is reduced.

Figure 3:
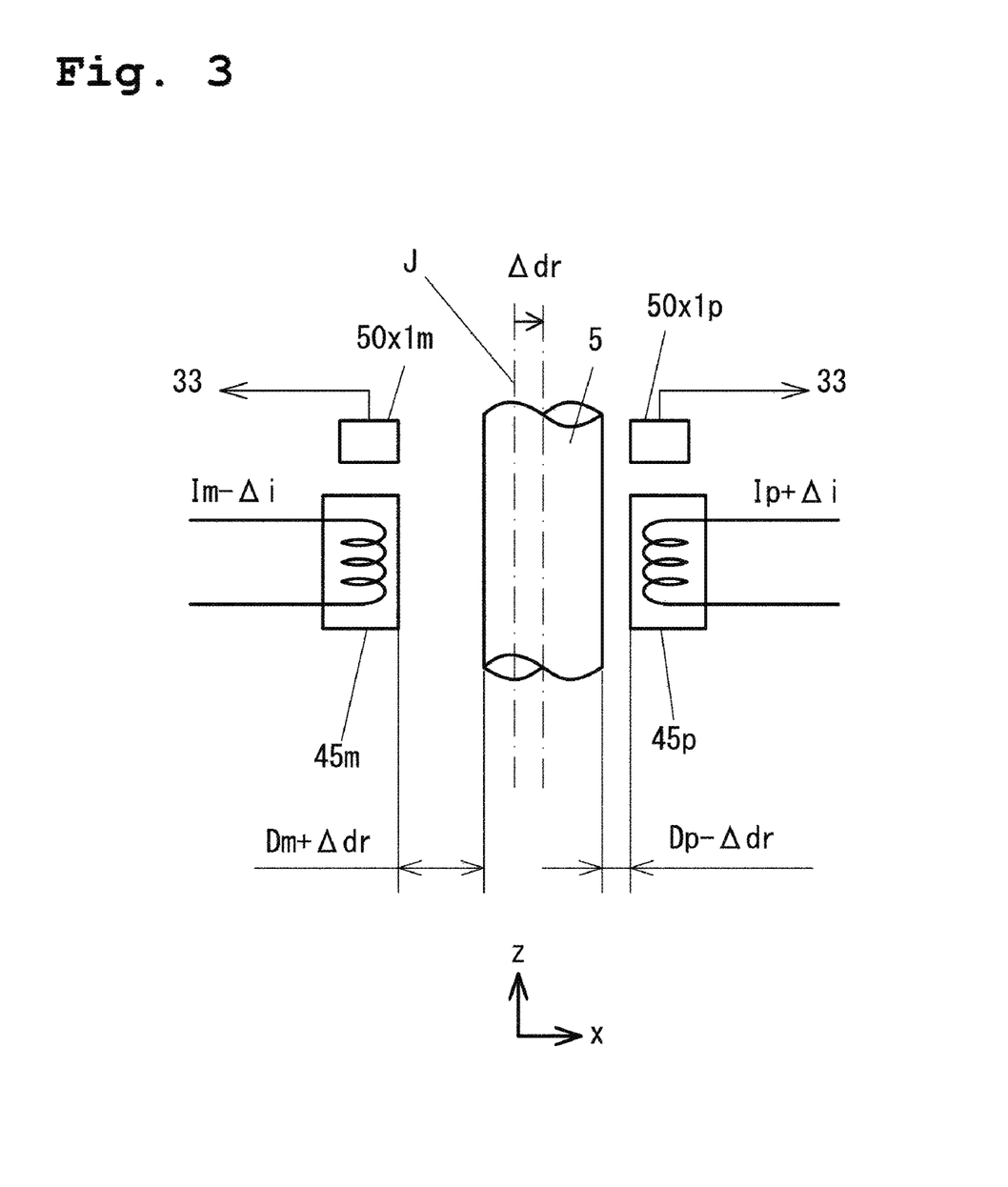
FIG. 3 is a view for describing force acting on a rotor shaft.

FIG. 3 is a view for describing the force acting on the rotor shaft 5. FIG. 3 is a view of the rotor shaft 5, magnetic bearing electromagnets 45p, 45m configured for a single axis (a x-axis direction) in the radial bearing, and displacement sensors 50x1p, 50x1m provided corresponding to the magnetic bearing electromagnets 45p, 45m. An excitation current ip, im flowing in the magnetic bearing electromagnet 45p, 45m contains a DC current component (also called a "bias current") for ensuring predetermined bearing stiffness and a control current for controlling the levitation position of the rotor shaft 5. That is, the levitation position (hereinafter referred to as a "rotor levitation position") of the rotor shaft 5 is controlled to a target levitation position J by fluctuation in the control current.

The DC current component and a current fluctuation component (a vibration current component) of the excitation current ip are represented by Ip, $\Delta$ip, and the DC current component and a current fluctuation component (a vibration current component) of the excitation current im are represented by Im, $\Delta$im. Generally, $\Delta$ip=−$\Delta$im=$\Delta$i is set. $\Delta$dr represents the displacement (the displacement in the x-axis direction) of the rotor levitation position from the target levitation position J, and the displacement in the direction of the magnetic bearing electromagnet 45p is a positive displacement. Note that Dp, Dm represents a clearance between the rotor shaft 5 and the magnetic bearing electromagnet 45p, 45m in a case where the rotor levitation position is levitated to the target levitation position J.

The attraction force Fp of the magnetic bearing electromagnet 45p is represented by Expression (1) below, and the attraction force Fm of the magnetic bearing electromagnet 45m is represented by Expression (2) below. Note that a coefficient k [Nm$^2$/A$^2$] is an electromagnet coefficient.

$$Fp=k(Ip/Dp)^2 \quad (1)$$

$$Fm=k(Im/Dm)^2 \quad (2)$$

In FIG. 3, the displacement $\Delta$dr (>0) and the current fluctuation component $\Delta$i in association with an increase in the attraction force Fp are illustrated. A fluctuation $\Delta$Fp, $\Delta$Fm in the attraction force Fp, Fm in association with the displacement $\Delta$dr and the current fluctuation component $\Delta$i is represented by Expression (3), (4) below by means of Expression (1), (2). The attraction forces Fp, Fm are in opposite directions. Thus, fluctuation in the force acting on the rotor shaft 5 satisfies $\Delta$Fp−$\Delta$Fm, and is represented by Expression (5). In Expressions (3) to (5), the first term on the right hand represents force fluctuation due to the current fluctuation component $\Delta$i, and the second term on the right hand represents force fluctuation due to the displacement $\Delta$dr from the target levitation position.

$$\Delta Fp=(2k\cdot Ip/Dp^2)\Delta i+(2k\cdot Ip^2/Dp^3)\Delta dr \quad (3)$$

$$\Delta Fm=(-2k\cdot Im/Dm^2)\Delta i+(-2k\cdot Im^2/Dm^3)\Delta dr \quad (4)$$

$$\Delta Fp-\Delta Fm=\{(2k\cdot Ip/Dp^2)+(2k\cdot Im/Dm^2)\}\Delta i+\{(2k\cdot Ip^2/Dp^3)+(2k\cdot Im^2/Dm^3)\}\Delta dr \quad (5)$$

For zeroing the fluctuation ($\Delta$Fp−$\Delta$Fm) in the force acting on the rotor shaft 5, the right hand of Expression (5) may be zero. That is, the current fluctuation component $\Delta$i of the excitation current ip, im is set as in Expression (6), and in this manner, the force fluctuation due to the displacement $\Delta$dr can be cancelled by the force fluctuation due to the current fluctuation component $\Delta$i. The displacement $\Delta$dr in Expression (6) is calculated based on the sensor signal 306 output from the sensor circuit 33 of FIG. 2.

$$\Delta i=-\{(Ip^2/Dp^3+Im^2/Dm^3)/(Ip/Dp^2+Im/Dm^2)\}\Delta dr \quad (6)$$

Note that $\{(Ip^2/Dp^3+Im^2/Dm^3)/(Ip/Dp^2+Im/Dm^2)\}$ in Expression (6) is a constant based on the DC current component Ip, Im in the excitation current ip, im, and is herein represented by reference characters I_D. A design value can be used as the clearance Dp, Dm in the case of production with high accuracy. Generally, the target levitation position is set to a middle position between the magnetic bearing electromagnets 45p, 45m, and therefore, Dp=Dm=D is satisfied. Thus, I_D is represented by Expression (7) below.

$$I\_D=(1/D)\cdot\{(Ip^2+Im^2)/(Ip+Im)\} \quad (7)$$

A displacement rotation frequency component $\Delta$dr($\Omega$) as a frequency component having an angular frequency $\Omega$ in the displacement $\Delta$dr is represented by Expression (8) below by means of a rotation reference signal $\theta(=\Omega\cdot t)$. Moreover, a current rotation frequency component $\Delta$i($\Omega$) as a frequency component having an angular frequency $\Omega$ in the current fluctuation component $\Delta$i is represented by Expression (9) by means of the rotation reference signal $\theta$.

$$\Delta dr(\Omega)=|dr(\Omega)|\cos(\theta+\varphi 1) \quad (8)$$

$$\Delta i(\Omega)=|i(\Omega)|\cos(\theta+\varphi 2) \quad (9)$$

Figure 4:
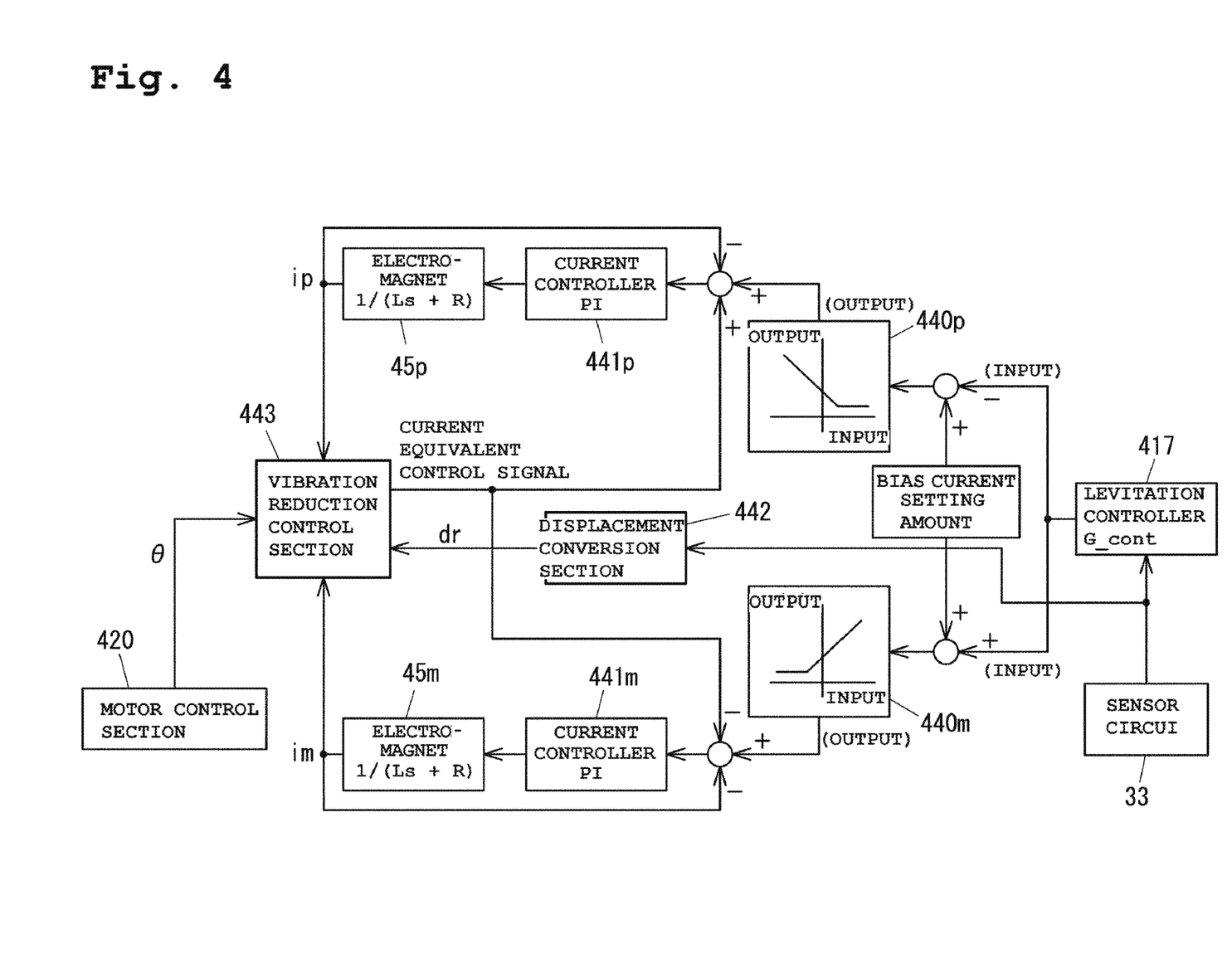
FIG. 4 is a block diagram of an outline configuration of a magnetic bearing control system.

Note that the rotation reference signal $\theta$ indicates a reference electric angle represented by $\theta=\Omega\cdot t$ by means of the rotation speed (the angular frequency) $\Omega$ of the rotor shaft 5. As illustrated in FIG. 4, the reference electric angle $\theta$ input from a motor control section 420 of a motor drive system is used in the present embodiment. In the motor drive system, the reference electric angle $\theta$ is, in the case of providing a rotation sensor such as a Hall sensor configured to detect a motor magnetic pole position, generated from a detection signal of the rotation sensor, and is generated using motor voltage in the case of a sensorless configuration. In the present embodiment, the method for generating the reference electric angle $\theta$ is not specifically limited.

For cancelling force fluctuation due to the displacement rotation frequency component $\Delta$dr($\Omega$) by force fluctuation due to the current rotation frequency component $\Delta$i($\Omega$) to remove vibration due to a rotation component, an amplitude in Expression (8), (9) needs to satisfy conditions represented by Expression (10) below. Moreover, a phase needs to satisfy conditions represented by Expression (11).

$$|i(\Omega)|=I\_D\cdot|dr(\Omega)| \quad (10)$$

$$\theta+\varphi 2=\theta+\varphi 1+\pi \quad (11)$$

FIG. 4 is a block diagram of an outline configuration of a magnetic bearing control system, and illustrates the configuration regarding the control for the single axis as illustrated in FIG. 3. The sensor signal output from the sensor circuit 33 is input to a magnetic levitation controller 417 and a displacement conversion section 442. The magnetic levitation controller 417 is configured to perform proportional control, integral control, derivative control, phase correction, and other types of control compensation based on the sensor signal, thereby generating a levitation control current setting amount.

Further, a bias current setting amount is added to the levitation control current setting amount. For p-side control, a value obtained by addition of the bias current setting amount to a negative value of the levitation control current setting amount is used. For m-side control, a value obtained by addition of the bias current setting amount to the levitation control current setting amount is used.

For example, in a case where the rotor shaft 5 approaches the p-side magnetic bearing electromagnet 45p as in FIG. 3, the levitation control current setting amount output from the magnetic levitation controller 417 is greater toward the magnetic bearing electromagnet 45p, and (Bias Current Setting Amount)−(Levitation Control Current Setting Amount) is smaller toward the magnetic bearing electromagnet 45p. That is, the current setting amount input to a current limiter circuit 440p is set such that the excitation current becomes lower. Normally, a current lower limit is set to zero. However, in a so-called self-sensing method for detecting rotor displacement by the electromagnets themselves, even in a case where the levitation control current setting amount is excessive, the output of the current limiter circuit 440p may be sometimes set with such a lower limit that the excitation current does not reach zero. An m-side current limiter circuit 440m also operates as in the current limiter circuit 440p in a case where the rotor shaft 5 extremely approaches the m-side magnetic bearing electromagnet 45m.

Meanwhile, when the sensor signal is input from the sensor circuit 33 to the displacement conversion section 442, the displacement conversion section 442 converts displacement of the rotor shaft 5 at a sensor position into displacement at an electromagnet position. Although details will be described later, a position in the axial direction (a Z-direction) is different among the displacement sensors 50x1p, 50x1m and the magnetic bearing electromagnets 45p, 45m as illustrated in FIG. 3. Thus, when the rotor shaft 5 tilts, a gap between displacement based on the sensor signal and displacement at the magnetic bearing electromagnet 45p, 45m occurs. The displacement conversion section 442 calculates the displacement at the electromagnet position based on the sensor signal, thereby outputting the displacement to a vibration reduction control section 443.

Detection signals of the excitation currents ip, im are, together with the above-described displacement at the electromagnet position, input to the vibration reduction control section 443. These detection signals will be herein also referred to as "excitation currents ip, im." The vibration reduction control section 443 outputs, based on the displacement at the electromagnet position, the excitation currents ip, im, and the reference rotation signal θ for rotor rotation, a current equivalent control signal corresponding to Δi represented by Expression (6) above. Note that in the present embodiment, the reference electric angle θ input from the motor control section 420 is used as the reference rotation signal θ.

For each of the current settings output from the current limiter circuits 440p, 440m, a difference from a feedback excitation current signal is taken, and the current equivalent control signal output from the vibration reduction control section 443 is further added. In typical magnetic bearing control, a current controller 441p, 441m generates, by PI arithmetic processing, the excitation current signal such that the difference between the current setting and the feedback excitation current component is zero. In the present embodiment, the excitation current signal is generated based on the signal obtained by addition of the current equivalent control signal to the difference signal, leading to reduction in pump vibration.

(Displacement Conversion Section 442)

Figure 5:
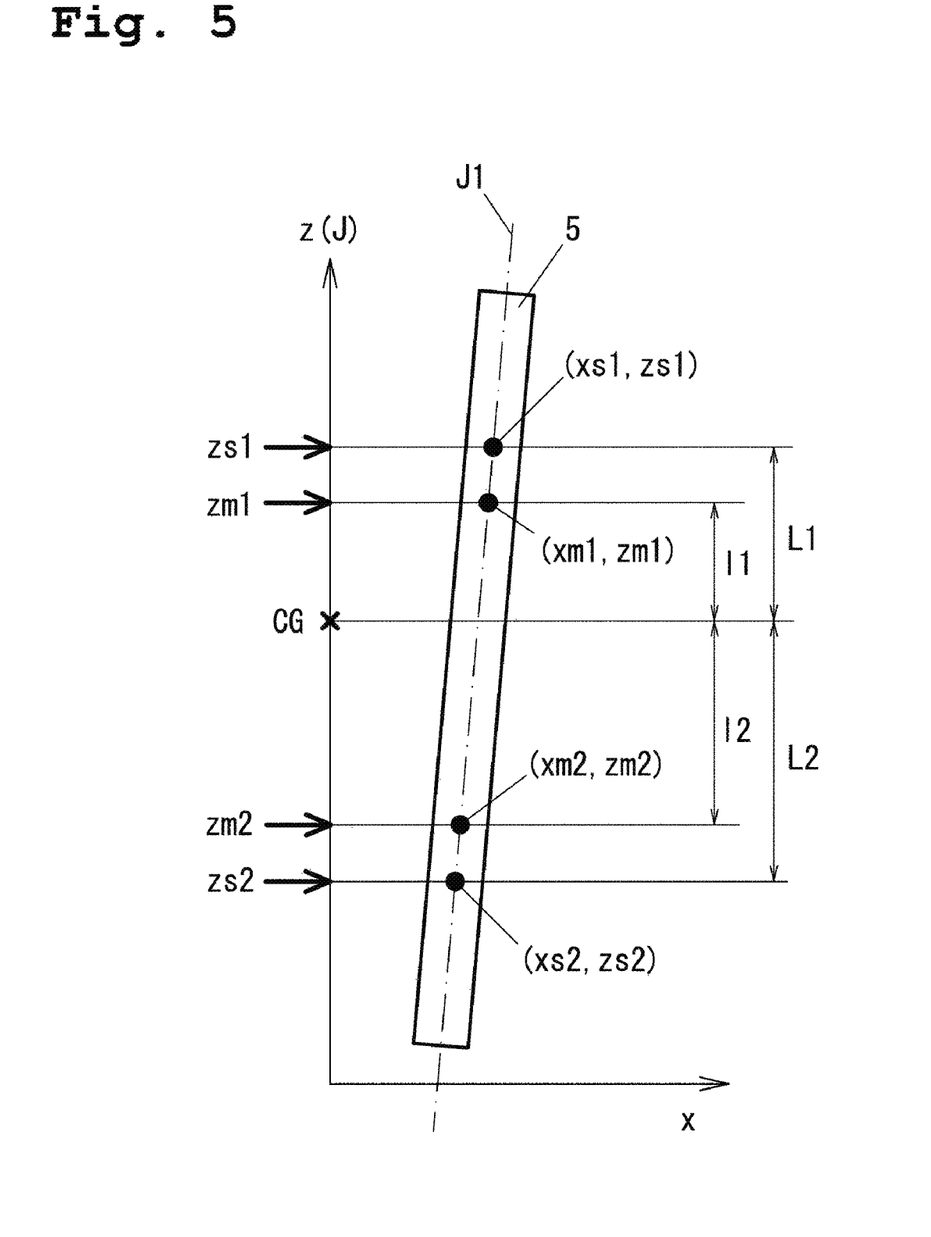
FIG. 5 is a view for describing displacement conversion processing.

Processing of the displacement conversion section 442 will be described with reference to FIG. 5. FIG. 5 illustrates displacement in the x-axis direction in the case of the tilting rotor shaft 5 such that the target levitation position J of the rotor shaft 5 is coincident with a z-axis. For a z-axis direction, an upper displacement sensor position is zs1, a lower displacement sensor position is zs2, an upper electromagnet position is zm1, and a lower electromagnet position is zm2. The rotor shaft 5 is regarded as a rigid body, and x coordinates at the positions zs1, zs2, zm1, zm2 of the center axis J1 of the rotor shaft 5 are xs1, xs2, xm1, xm2.

The position of the center of gravity of the pump rotor 3 (see FIG. 1) in a case where the rotor shaft 5 is levitated to the target levitation position J is CG. A distance from the position CG of the center of gravity to the displacement sensor position zs1, zs2 is L1, L2, and a distance from the position CG of the center of gravity to the electromagnet position zm1, zm2 is l1, l2.

In FIG. 5, the target levitation position J is coincident with the z-axis, and therefore, the x coordinates xs1, xs2 of the displacement sensor positions zs1, zs2 represent sensor position displacement detected by the displacement sensors. Similarly, the x coordinates xm1, xm2 of the electromagnet positions zm1, zm2 represent magnet position displacement at the electromagnet positions zm1, zm2.

In this case, the magnet position displacement xm1, xm2 is represented as in Expression (12), (13) below by means of the sensor position displacement xs1, xs2. Note that in Expressions (12), (13), the displacements xs1, xs2, xm1, xm2 are described as functions for a time t. Similarly, a magnet position displacement ym1(t), ym2(t) in a y-axis direction is represented as in Expression (14), (15) below by means of a sensor position displacement ys1(t), ys2(t) in the y-axis direction at the displacement sensor position.

$$xm1(t)=(l1-L1)/(L1+L2)\times\{xs1(t)-xs2(t)\}+xs1(t) \quad (12)$$

$$xm2(t)=(-l2-L1)/(L1+L2)\times\{xs1(t)-xs2(t)\}+xs1(t) \quad (13)$$

$$ym1(t)=(l1-L1)/(L1+L2)\times\{ys1(t)-ys2(t)\}+ys1(t) \quad (14)$$

$$ym2(t)=(-l2-L1)/(L1+L2)\times\{ys1(t)-ys2(t)\}+ys1(t) \quad (15)$$

(Vibration Reduction Control Section 443)

Figure 6:
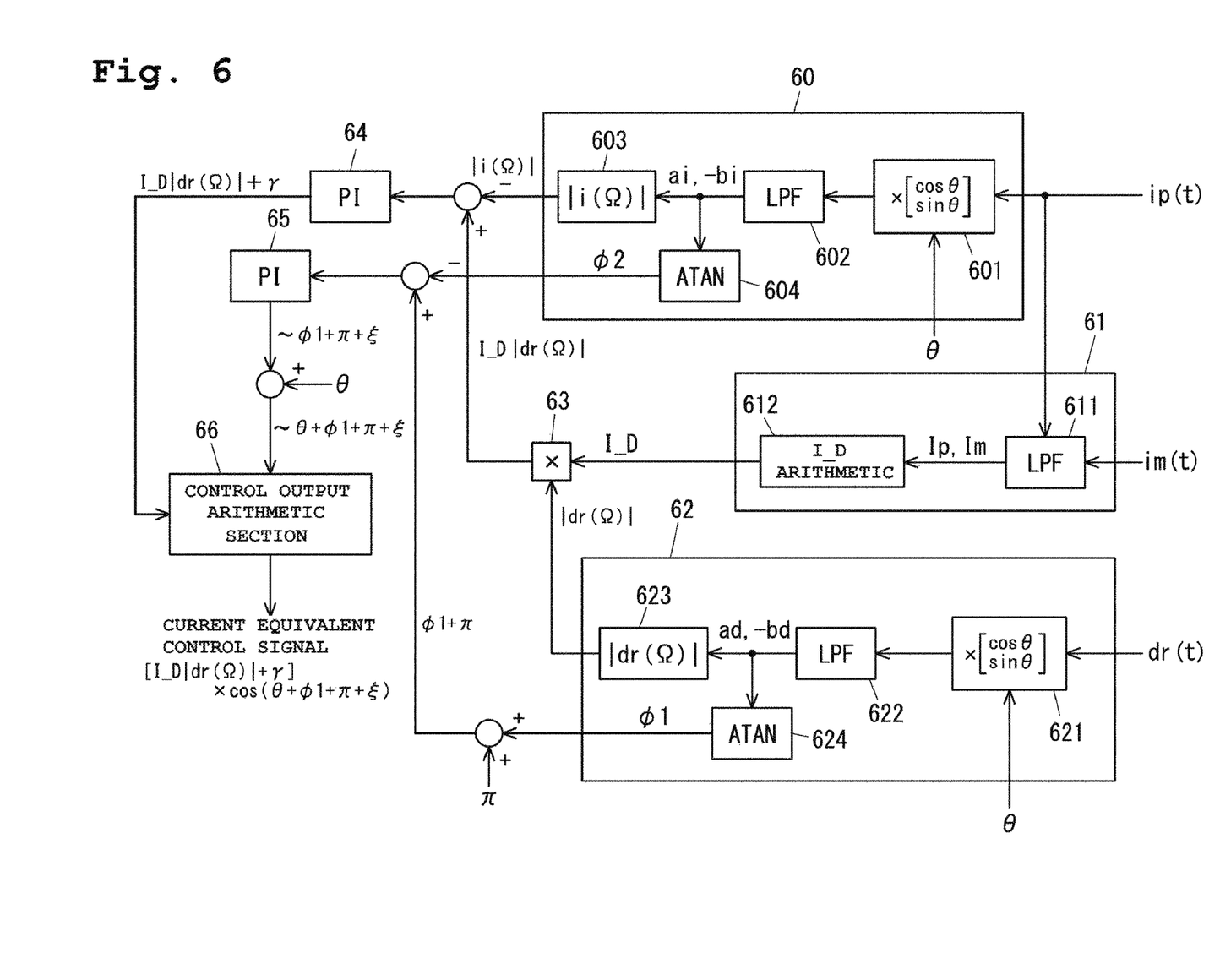
FIG. 6 is a block diagram of details of vibration reduction control.

FIG. 6 is a block diagram of details of control in the vibration reduction control section 443. The vibration reduction control section 443 includes a current rotation component arithmetic section 60 configured to perform arithmetic processing for the rotation component contained in the current signal, a current DC component arithmetic section 61 configured to perform arithmetic processing for the DC component contained in the current signal, and a displacement rotation component arithmetic section 62 configured to perform arithmetic processing for the rotation component contained in the sensor signal 306 from the sensor circuit 33.

As illustrated in FIG. 4, both of the p-side and m-side excitation current signals are input to the vibration reduction control section 443, but any one of the excitation current signals ip(t), im(t) is used for the arithmetic processing in the current rotation component arithmetic section 60. The signal regarding the bias current setting amount (the DC component) is added to the output signal of the magnetic levitation controller 417 of FIG. 4. The current limiter circuit 440p, 440m configured to limit the current in the case of great asymmetric properties of the DC current components Ip, Im, such as the case of the pump main body in a horizontal attitude, is provided.

With the current limiter circuits 440p, 440m, the m-side DC current component is 0 [A] when the DC component of the p-side excitation current signal ip(t) reaches, for example, equal to or greater than twice as much as the bias current setting amount. There is a case where one side reaches 0 [A] as described above, but no current rotation component can be extracted on the side with 0 [A]. An example illustrated in FIG. 6 shows a case where the DC current component satisfies Ip>Im. In this case, the current rotation component is extracted using the p-side excitation current signal ip(t) on the side on which the DC current component is not 0 [A]. As described above, in the case of extracting the current rotation component, the current rotation component definitely needs to be extracted from the excitation current signal on the side with a greater DC current component.

The p-side excitation current signal ip(t) is input to a signal multiplication section 601 of the current rotation component arithmetic section 60. In the signal multiplication section 601, signals cos θ, sin θ are generated based on the rotation reference signal θ. For extracting the rotation component, the input excitation current signal ip(t) is multiplied by each of the signals cos θ, sin θ.

For example, a case where ip(t) fluctuates with respect to the rotation reference signal θ as in ip(t)=i0·cos(θ+φ2) is assumed. In this case, φ2 represents a phase shift with respect to the rotation reference signal θ. In this case, ip(t) is represented as in Expression (16) below, and therefore, values obtained by multiplication of ip(t) by cos θ, sin θ are represented as in Expressions (17), (18) below.

$$ip(t)=i0(\cos \theta \cos \varphi 2-\sin \theta \sin \varphi 2) \tag{16}$$

$$ip(t)\cos \theta=(i0/2)\{\cos \varphi 2 \cdot (1+\cos 2\theta)-\sin \varphi 2 \sin 2\theta\} \tag{17}$$

$$ip(t)\sin \theta=(i0/2)\{\cos \varphi 2 \sin 2\theta-\sin \varphi 2 \cdot (1-\cos 2\theta)\} \tag{18}$$

When the signals represented by Expressions (17), (18) are filtered by a low-pass filter 602, the term including 2θ is removed. Accordingly, ai=(i0/2)cos φ2 is extracted as the DC component from ip(t)cos θ of Expression (17), and bi=−(i0/2)sin φ2 is extracted as the DC component from ip(t)sin θ of Expression (18). The values ai, bi each correspond to the amplitude values of the cos θ component and the sin θ component in Expression (16).

Figure 7:
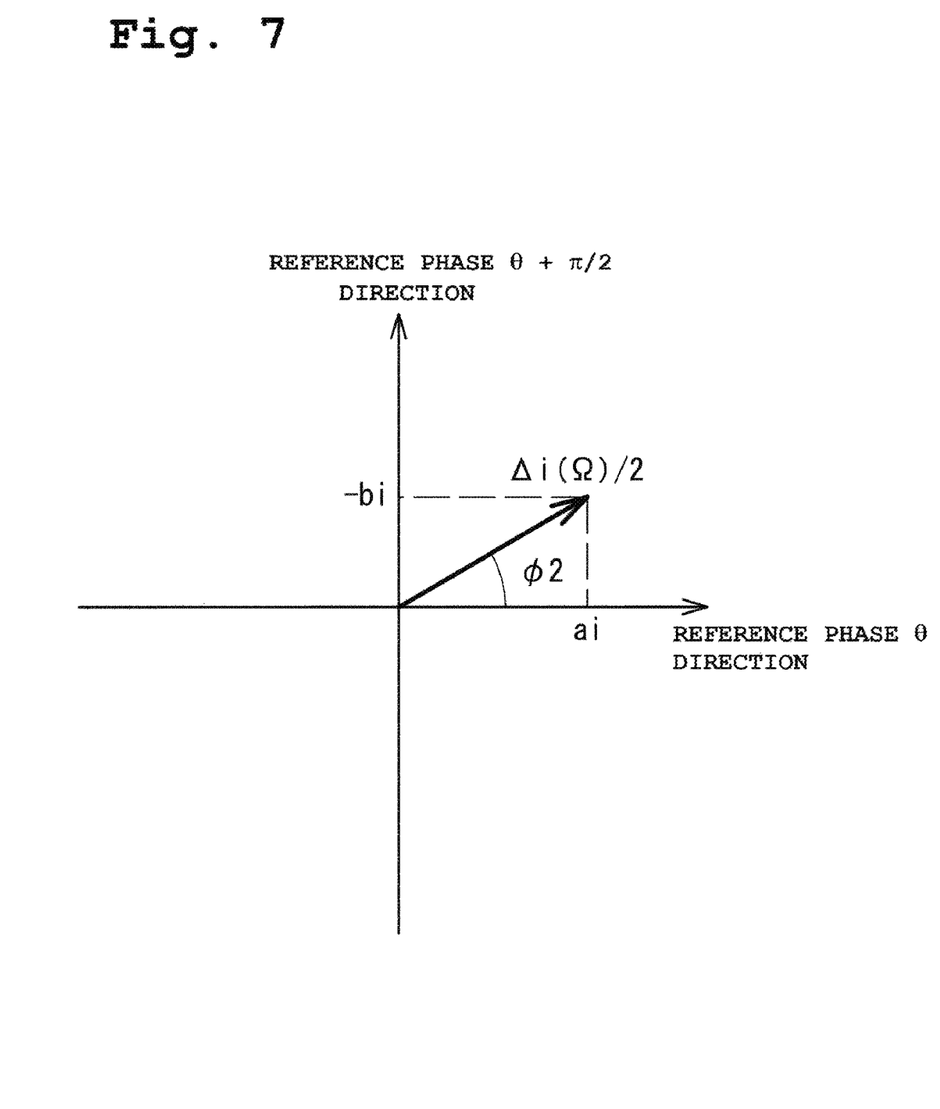
FIG. 7 is a graph for describing a current rotation frequency component.

The current rotation frequency component Δi(Ω) in the current fluctuation component Δi is represented by an arrow vector rotatable about a reference phase θ on the coordinates as illustrated in FIG. 7. Note that ai, bi is the value of ½ of the amplitude of cos θ, sin θ of Expression (16). Thus, the square root of the square sum of the amplitude values ai, bi is doubled as in Expression (19) below, and in this manner, the amplitude |i(Ω)| of the current rotation frequency component Δi(Ω) is obtained. Moreover, the phase φ2 is provided by Expression (20) below.

$$|i(\Omega)|=2\sqrt{(ai^2+bi^2)} \tag{19}$$

$$\varphi 2=\arc \tan(-bi/ai) \tag{20}$$

The amplitude values ai, bi extracted by filtering are input to an amplitude arithmetic section 603 and a phase arithmetic section 604. The amplitude |i(Ω)| is calculated in the amplitude arithmetic section 603, and the phase φ2 is calculated in the phase arithmetic section 604.

In the current DC component arithmetic section 61, the excitation current signals ip(t), im(t) are filtered by a low-pass filter 611, and in this manner, the DC current components Ip, Im are extracted. After installation of the pump main body, the DC current component does not basically change as long as an installation attitude is not changed. Thus, the low-pass filter 611 whose corner frequency is set to an extremely low frequency (e.g., equal to or lower than 0.1 Hz) is used.

An I_D arithmetic section 612 is configured to calculate the I_D value represented by Expression (7) by means of the extracted DC current components Ip, Im. Note that the clearance D is stored in advance in a not-shown storage.

$$I\_D=(1/D)\cdot\{(Ip^2+Im^2)/(Ip+Im)\} \tag{7}$$

A detected displacement signal (a sensor signal) dr(t) is input to a signal multiplication section 621 of the displacement rotation component arithmetic section 62. In the signal multiplication section 621, signals cos θ, sin θ are generated based on the rotation reference signal θ. For extracting the rotation component, the input displacement signal dr(t) is multiplied by each of the signals cos θ, sin θ. Then, as in the case of the current rotation component arithmetic section 60, signals obtained by multiplication of the displacement signal dr(t) by the signals cos θ, sin θ are filtered by a low-pass filter 622. As a result, amplitude values ad, bd, of the cos θ component and the sin θ component are extracted.

The amplitude values ad, bd each correspond to the amplitude values ai, bi. By exactly the same arithmetic processing, an amplitude |dr(Ω)| is calculated as in Expression (21) below in an amplitude arithmetic section 623, and a phase φ1 with respect to the rotation reference signal θ is calculated as in Expression (22) below in a phase arithmetic section 624.

$$|dr(\Omega)|=2\sqrt{(ad^2+bd^2)} \tag{21}$$

$$\varphi 1=\arc \tan(-bd/ad) \tag{22}$$

The I_D value calculated in the I_D arithmetic section 612 and the amplitude |dr(Ω)| calculated in the amplitude arithmetic section 623 are subjected to multiplication in a multiplier 63. Further, a deviation from the current rotation component amplitude |i(Ω)| is taken using a target amplitude value as I_D·|dr(Ω)|. By, e.g., proportional-integral (PI) control containing at least an integral element to the amplitude deviation I_D·|dr(Ω)|−|i(Ω)|, an amplitude control signal generator 64 generates an amplitude control signal.

The amplitude control signal output from the amplitude control signal generator 64 corresponds to Expression (10) regarding the amplitude among Condition Expressions (10), (11) for cancelling the force fluctuation due to the displacement Δdr by the force fluctuation due to the current fluctuation component Δi to remove vibration due to the rotation component. For example, a value proportional to I_D·|dr(Ω)| is output as the amplitude control signal. This amplitude control signal is, together with the levitation control current setting amount of the magnetic levitation controller 417, eventually input and fed back to the current controllers 441*p*, 441*m*. However, a remaining rotation component signal is on the input signal (the sensor signal) from the magnetic levitation controller 417, and therefore, a value represented by I_D·|dr(Ω)|+γ is, considering cancellation (herein referred to as "γ") of the remaining component, taken as the amplitude control signal.

Then, π is added to the phase φ1 calculated in the phase arithmetic section 624 of the displacement rotation component arithmetic section 62, and the deviation of the target phase value as φ1+π from the phase φ2 calculated in the phase arithmetic section 604 of the current rotation component arithmetic section 60 is taken. By, e.g., proportional-integral (PI) control containing at least an integral element to the phase deviation φ1+π−φ2, a phase control signal generation section 65 generates a phase control signal. In this case, the phase control signal to which a value ξ for cancelling the remaining rotation component signal in the input signal from the magnetic levitation controller 417 is added is output from the phase control signal generation section 65. Then, a signal obtained by addition of the rotation reference signal θ to the phase control signal is input to a control output arithmetic section 66.

The control output arithmetic section 66 is configured to generate, based on the input amplitude control signal and the input phase control signal, the current equivalent control signal as a feedback control signal, i.e., sinusoidal output of a current equivalent rotation component. That is, an automatic adjustment mechanism is produced, which is configured to extract amplitude and phase information corresponding to $\Delta i(\Omega)=|i(\Omega)|\cos(\theta+\varphi 2)$ shown in Expression (9) and $\Delta dr(\Omega)=|dr(\Omega)|\cos(\theta+\varphi 1)$ shown in Expression (8) to output the current equivalent control signal for cancelling the force fluctuation due to the displacement Δdr. In this example, $[I\_D\cdot|dr(\Omega)|+\gamma]\cos(\theta+\varphi 1+\pi+\xi)$ is output as the current equivalent control signal for cancelling, including the remaining component, the force fluctuation due to the displacement Δdr. As illustrated in FIG. 4, the output current equivalent control signal is directly added to the p-side, and a negative value of the current equivalent control signal is added to the m-side (i.e., subtraction is performed).

Note that the above-described rotation component remaining in the input from the magnetic levitation controller 417 leads to a type of stationary disturbance against feedback control. In the present embodiment, the amplitude component γ and the phase component ξ for removing a disturbance equivalent portion are constantly generated as an output deviation in PI control output. Automatic adjustment is also performed for the disturbance.

(C1) In the above-described embodiment, the control section 44 of the control device 1B calculates, with respect to the reference rotation signal θ, the phase φ2 and the amplitude value $|i(\Omega)|$ of the current rotation frequency component $\Delta i(\Omega)$ contained in the excitation current in the current rotation component arithmetic section 60; calculates, with respect to the reference rotation signal θ, the phase φ1 and the amplitude value $|dr(\Omega)|$ of the displacement rotation frequency component $\Delta dr(\Omega)$ contained in the displacement signal in the displacement rotation component arithmetic section 62; and calculates, in the current DC component arithmetic section 61, the ratio I_D between the amplitude $|i(\Omega)|$ of the current rotation frequency component $\Delta i(\Omega)$ and the amplitude $|dr(\Omega)|$ of the displacement rotation frequency component $\Delta dr(\Omega)$ in the case of cancelling the force generated due to the displacement rotation frequency component $\Delta dr(\Omega)$ by the force generated due to the current rotation frequency component $\Delta i(\Omega)$. The control section 44 performs the feedback control such that the phase φ2 is equal to the value obtained by addition of a phase value of 180 degrees to the phase φ1 and that the amplitude value $|i(\Omega)|$ of the current rotation frequency component $\Delta i(\Omega)$ is equal to the product of the displacement rotation frequency component $\Delta dr(\Omega)$ and the ratio I_D.

By such feedback control, the force from the electromagnet due to the whirling displacement Δdr caused by rotor unbalance can be, even without typical gain adjustment or phase adjustment, cancelled by the electromagnetic force due to excitation current fluctuation caused in association with the displacement Δdr.

(C2) Further, it is configured such that the phase control signal generation section 65 and the amplitude control signal generator 64 have integral equivalent amounts (the integral elements), and therefore, the remaining component can be more effectively removed.

Moreover, the current DC component arithmetic section 61 includes the low-pass filter 611 configured to detect the DC components Ip, Im of the excitation current, and the ratio I_D is calculated based on the extracted DC components Ip, Im. Thus, even in a case where a user optionally sets the installation attitude of the magnetic bearing equipped device with respect to the gravity, the ratio I_D reflects a change in the DC components Ip, Im due to a change in the installation attitude. As a result, vibration reduction can be realized regardless of the installation attitude.

Further, in the displacement conversion section 442, the displacement signal corresponding to displacement at the magnetic bearing position is generated based on the sensor signal from the displacement sensor configured to detect displacement of the levitation position of the rotor shaft 5, and the phase φ1 and the amplitude $|dr(\Omega)|$ are calculated based on the displacement signal. Thus, rotor displacement detection accuracy is improved, and a vibration reduction effect is improved.

Note that the configuration illustrated in FIGS. 1 and 2 is the configuration for detecting the rotor position by the displacement sensors. However, the present invention is also applicable to the so-called self-sensing magnetic bearing device configured to detect rotor displacement by the electromagnets themselves.

The control system illustrated in FIGS. 4 and 6 is illustrated for the single axis, but may be provided for all axes of the active magnetic bearing to apply the above-described control to all axes. In the case of the present embodiment, the five-axis active magnetic bearing is employed as illustrated in FIG. 1, and therefore, five groups of control systems are applied. In a case where an attempt is made to reduce vibration only in the axial direction of the rotor, the above-described control may be applied only to the axial axis. Further, in a case where a specific axis with great vibration is known in advance, even when the above-described control is applied only to the specific axis, a great vibration reduction effect is obtained.

Note that in addition to the feedback control for rotation component reduction in the present embodiment, feedforward control for rotation component reduction as described in Patent Literature 1 (JP-A-2017-075666) may be provided.

The following variations are also within the scope of the present invention, and one or more of the variations may be combined with the above-described embodiment.

(First Variation)

Figure 8:
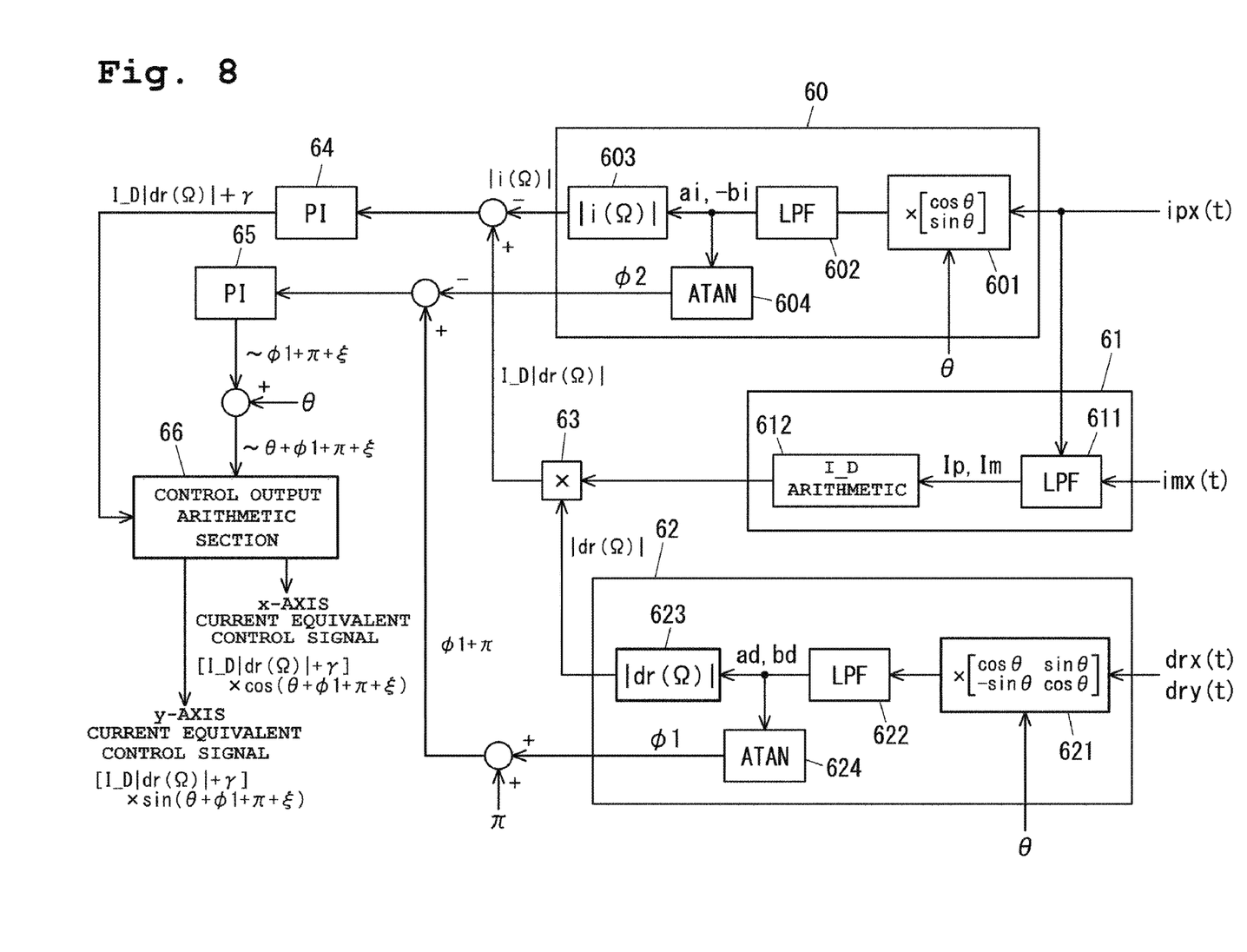
FIG. 8 is a block diagram for describing a first variation.

FIG. 8 is a block diagram for describing a first variation. The first variation illustrated in FIG. 8 is applicable to a case where the pump main body is placed such that influence of the gravity is equal between two pairs of radical axes of the magnetic bearings, i.e., an X-Y axis at a rotor upper portion and an X-Y axis at the rotor lower portion (i.e., the influence is the same between a greater DC current component side and a smaller DC current component side and between the x-axis and the y-axis). That is, the first variation is applicable to the case of equal whirling by a displacement rotation component in an xy plane. Needless to say, application only to one of two pairs is available.

In a configuration illustrated in FIG. 8, the processing of the signal multiplication section 621 and the amplitude arithmetic section 623 in the displacement rotation component arithmetic section 62 and the processing of the control output arithmetic section 66 are different from processing contents of corresponding sections in FIG. 6. In the current rotation component arithmetic section 60, x-axis excitation current signals ixp(t), ixm(t) are used. In the displacement rotation component arithmetic section 62, arithmetic processing is performed based on displacements drx(t), dry(t) for two axes.

The current rotation component arithmetic section 60 in the case of Ipx>Imx is illustrated, and the p-side excitation current signal ipx(t) is input to the signal multiplication section 601. The processing in the signal multiplication section 601, the low-pass filter 602, the amplitude arithmetic section 603, and the phase arithmetic section 604 is similar to that in the case illustrated in FIG. 6, and therefore, description thereof will be omitted. The amplitude $|i(\Omega)|$ is output from the amplitude arithmetic section 603, and the phase $\varphi 2$ is output from the phase arithmetic section 604. Moreover, the I_D value based on the DC current components Ip, Im is, as in the case illustrated in FIG. 6, output from the I_D arithmetic section 612 of the current DC component arithmetic section 61.

In the signal multiplication section 621 of the displacement rotation component arithmetic section 62, a signal (a signal represented in a matrix as illustrated in FIG. 8) for extracting a rotation component of the displacement signal (drx(t), dry(t)) is generated based on the input rotation reference signal $\theta$. Then, a signal obtained by action of the signal for extraction on the displacement signal (drx(t), dry(t)) is filtered by the low-pass filter 622, and in this manner, the amplitude values ad, bd of the cos $\theta$ component and the sin $\theta$ component are extracted. In the amplitude arithmetic section 623, the amplitude $|dr(\Omega)|=\sqrt{(ad^2+bd^2)}$ based on ad and bd is calculated. Moreover, in the phase arithmetic section 624, the phase $\varphi 1$=arc tan(bd/ad) with respect to the rotation reference signal $\theta$ is calculated based on ad and bd.

The amplitude control signal generator 64 generates the amplitude control signal based on the amplitude deviation $I\_D \cdot |dr(\Omega)| - |i(\Omega)|$, and the phase control signal generation section 65 generates the phase control signal based on the phase deviation $\varphi 1+\pi-\varphi 2$. The control output arithmetic section 66 outputs, based on the input amplitude control signal and the input phase control signal, the current equivalent control signal as the feedback control signal to each of the x-axis and the y-axis. For example, $[I\_D \cdot |dr(\Omega)|+\gamma]\cos(\theta+\varphi 1+\pi+\xi)$ is output to the p-side and the m-side of the x-axis, and $[I\_D \cdot |dr(\Omega)|+\gamma]\sin(\theta+\varphi 1+\pi+\xi)$ is output to the p-side and the m-side of the y-axis. In this example, $\gamma$, $\xi$ are for removing the rotation component remaining in the input from the magnetic levitation controller 417 as in the case described with reference to FIG. 6.

The above-described first variation is applicable to the case where the pump main body is placed such that the influence of the gravity is equal between two pairs of radical axes of the magnetic bearings, i.e., the X-Y axis at the rotor upper portion and the X-Y axis at the rotor lower portion (i.e., the influence is the same between the greater DC current component side and the smaller DC current component side and between the x-axis and the y-axis). That is, the first variation is applicable to the case of equal whirling by the displacement rotation component in the xy plane. Needless to say, application only to one of two pairs is available.

(Second Variation)

The case where there are no amplitude reduction and no phase delay in the displacement signal input to the vibration reduction control section 443 of FIG. 4 has been described with reference to FIGS. 6 and 8. However, in a case where a gain change and a phase delay in the filter of the sensor circuit 33 cannot be ignored as described in Patent Literature 1, these values (a correction gain $G\beta$ and a correction phase $\varphi\beta$) may be stored in advance, the target amplitude value maybe corrected as in $I\_D \cdot |dr(\Omega)| \rightarrow G\beta \cdot I\_D \cdot |dr(\Omega)|$, and the target phase value may be corrected as in $\varphi 1+\pi \rightarrow \varphi 1+\pi+\varphi\beta$. As a result, in the case of applying the second variation to FIG. 6, the current equivalent control signal output from the control output arithmetic section 66 is $[G\beta \cdot I\_D \cdot |dr(\Omega)|+\gamma]\cos(\theta+\varphi 1+\pi+\varphi\beta+\xi)$.

In the above-described embodiment and variations, a fundamental wave of the rotation frequency component has been described by way of example. However, the reference rotation signal $\theta$ is replaced with a harmonic $n\theta$, and in this manner, processing similar to that in the case of the fundamental wave is also performed for the harmonic.

In a case where the direction of installation of the magnetic bearing device with respect to the gravity is known in advance, the DC current component of the excitation current is known in advance. Thus, the low-pass filter 611 configured to detect the DC current component can be omitted.

A variety of embodiments and variations has been described above, but the present invention is not limited to these contents. Other aspects conceivable within the scope of the technical idea of the present invention are also included in the scope of the present invention. Moreover, a vacuum pump has been described as an example of the device equipped with the magnetic bearing device, but the present invention is not limited to the vacuum pump.

What is claimed is:

1. A vacuum pump comprising:
   a pump rotor to be rotatably driven by a motor;
   an active magnetic bearing device configured to magnetically levitate and support a rotor shaft of the pump rotor, the active magnetic bearing device including a magnetic bearing having at least a single-axis; and
   a magnetic bearing control device for controlling the active magnetic bearing device, the magnetic bearing control device comprising:
   a control circuit:
      configured to calculate, with respect to a reference rotation signal, a current rotation component phase value and a current rotation component amplitude value of a current rotation frequency component contained in excitation current of the magnetic bearing,
      configured to calculate, with respect to the reference rotation signal, a displacement rotation component phase value and a displacement rotation component amplitude value of a displacement rotation frequency component contained in a displacement signal of the rotor shaft;
      configured to calculate a ratio between an amplitude value of the current rotation frequency component and an amplitude value of the displacement rotation frequency component in the case of cancelling force generated by the displacement rotation frequency component by force generated by the current rotation frequency component; and
   output a feedback control signal which is added to a control signal provided to the magnetic bearing such that the current rotation component phase value is equal to a value obtained by addition of a phase value of 180 degrees to the displacement rotation component phase value and that the current rotation component amplitude value is equal to a product of the displacement rotation component amplitude value and the ratio.

2. The vacuum pump according to claim 1, wherein the control circuit
   takes, as input, a deviation between the value obtained by the addition and the current rotation component phase value and having an integral equivalent amount;
   takes, as input, a deviation between the product of the displacement rotation component amplitude value and the ratio and the current rotation component amplitude value and having an integral equivalent amount; and is configured to generate a current rotation component sinusoidal signal based on the deviations, wherein the feedback control is performed using the current rotation component sinusoidal signal.

3. The vacuum pump according to claim 1, wherein the magnetic bearing is a two-axis radial magnetic bearing configured to support the rotor shaft in a radial direction, and the control circuit calculates, with respect to the reference rotation signal, a displacement rotation component phase value and a displacement rotation component amplitude value of a displacement rotation frequency component contained in a displacement signal for each axis direction of the two axes.

4. The vacuum pump according to claim 3, wherein the control circuit takes, as input, a deviation between the value obtained by the addition and the current rotation component phase value and having an integral equivalent amount;

takes, as input, a deviation between the product of the displacement rotation component amplitude value and the ratio and the current rotation component amplitude value and having an integral equivalent amount; and is configured to generate, based on the deviations, a current rotation component sinusoidal signal as a feedback control signal for one of the two axes of the two-axis radial magnetic bearing and generate a current rotation component cosine signal as a feedback control signal for the other axis of the two-axis radial magnetic bearing.

5. The vacuum pump according to claim 1, wherein the control circuit is configured to extract a DC component of the excitation current, and calculates the ratio based on the extracted DC component.

6. The vacuum pump according to claim 1, wherein the control circuit is configured to generate a displacement signal corresponding to displacement at a magnetic bearing position based on a sensor signal from a displacement sensor configured to detect displacement of a levitation position of the rotor shaft, and calculates the displacement rotation component phase value and the displacement rotation component amplitude value based on the displacement signal.

* * * * *